(12) United States Patent
Lin

(10) Patent No.: US 11,803,113 B2
(45) Date of Patent: Oct. 31, 2023

(54) LIGHT SOURCE MODULE AND PROJECTION APPARATUS

(71) Applicant: Coretronic Corporation, Hsin-Chu (TW)

(72) Inventor: Po-Hung Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/531,819

(22) Filed: Nov. 22, 2021

(65) Prior Publication Data
US 2022/0171271 A1    Jun. 2, 2022

(30) Foreign Application Priority Data
Nov. 30, 2020   (CN) .......................... 202022827997.7

(51) Int. Cl.
   *G03B 21/20*    (2006.01)
(52) U.S. Cl.
   CPC ............................... *G03B 21/2033* (2013.01)
(58) Field of Classification Search
   CPC ............ G03B 21/2013; G03B 21/2033; F21Y 2105/00–18
   See application file for complete search history.

(56) References Cited

U.S. PATENT DOCUMENTS

| 9,158,188 B2 * | 10/2015 | Hayashi | ............ G03B 21/2033 |
| 2014/0029637 A1 * | 1/2014 | Schmidt | .............. H01S 5/02212 372/44.01 |

FOREIGN PATENT DOCUMENTS

| TW | M379175 U1 | 4/2010 |
| TW | I404282 B1 | 8/2013 |

* cited by examiner

*Primary Examiner* — Jason M Han

(57) ABSTRACT

The invention provides a light source module including a substrate, a plurality of light emitting elements, a buffer element, and a cover plate. The substrate has a plurality of accommodation grooves. The light emitting elements are respectively disposed in the accommodation grooves. Each light emitting element has a light emitting portion and a bottom portion connected to each other. The light emitting portion is located on the bottom portion, and the bottom portion has an edge. The buffer element is pressed against the edges of the bottom portions of the light emitting elements. The cover plate is combined with the substrate and is pressed against the buffer element. The cover plate has a plurality of first openings. These first openings respectively expose the light emitting elements. The invention also provides a projection apparatus has above-mentioned light source module.

20 Claims, 10 Drawing Sheets

LIGHT SOURCE MODULE AND PROJECTION APPARATUS

CROSS-REFERENCE TO RELATED APPLICATION

This application claims the priority benefit of CN202022827997.1, filed on Nov. 30, 2020. The entirety of the above-mentioned patent application is hereby incorporated by reference herein and made a part of this specification.

FIELD OF THE INVENTION

The invention relates to a light source module, and more particularly to a light source module for a projection apparatus, and a projection apparatus having the light source module.

BACKGROUND OF THE INVENTION

With the market requirements for the brightness, color saturation, service life, non toxicity and environmental protection of the projection apparatuses, the types of light sources used in projection apparatuses have evolved from ultra high pressure mercury lamps (UHP lamps) and light emitting diodes (LEDs) to the laser diode (LD).

Because the high cost of current high brightness red laser diodes and green laser diodes, blue lasers are usually used as light sources to reduce costs. The wavelength conversion element is generally arranged on a transmission path of an excitation beam provided by the light source to convert the excitation beam (e.g., blue excitation beam) into other colored light (e.g., yellow light and green light) required to form a projection image.

In the prior art, a plurality of laser diodes are arranged in an array to form a light source module, so as to increase the energy of the excitation beam. Ideally, these optical axes of these laser diodes are required be substantially parallel, so that the light spot of the excitation beam irradiated on the wavelength conversion element can be uniform. However, in the prior art, some laser diodes often have the problem of optical axis tilting, which causes the failing of the light source module to provide a uniform light spot. In this case, the image quality of the projection apparatus also deteriorates.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a light source module to improve the uniformity of the light spot.

The invention provides a projection apparatus to provide good image quality.

Other advantages and objects of the invention may be further illustrated by the technical features broadly embodied and described as follows.

In order to achieve one or a portion of or all of the objects or other objects, the light source module provided by the invention includes a substrate, a plurality of light emitting elements, a buffer element, and a cover plate. The substrate has a plurality of accommodation grooves. The light emitting elements are respectively disposed in the plurality of accommodation grooves. Each of the light emitting elements has a light emitting portion and a bottom portion connected with each other. The light emitting portion is located on the bottom portion, and the bottom portion has an edge. The buffer element is pressed against the edges of the bottom portions of the light emitting elements. The cover plate is combined with the substrate, and is pressed against the buffer element. The cover plate has a plurality of first openings. These first openings respectively expose the light emitting elements.

In order to achieve one or a portion of or all of the objects or other objects, the projection apparatus provided by the invention includes an illumination system, a light valve, and a projection lens. The illumination system is configured to provide an illumination beam. The light valve is disposed on a transmission path of the illumination beam to covert the illumination beam into an image beam. The projection lens is disposed on a transmission path of the image beam. The illumination system includes the above-mentioned light source module.

In the light source module of the invention, the plurality of light emitting elements are respectively arranged in the plurality of accommodation grooves of the substrate, and the buffer element is pressed between the bottom portions of the light emitting elements and the cover plate. Thus the cover plate can indirectly apply force to each of the light emitting elements through the buffer element to evenly distribute the pressure on the light emitting elements. In this way, the optical axis of each of the light emitting elements can be prevented from tilting, and the light spot uniformity of the light source module can be improved. On the other hand, since the projection apparatus of the invention has the above-mentioned light source module, the projection apparatus can provide good image quality.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
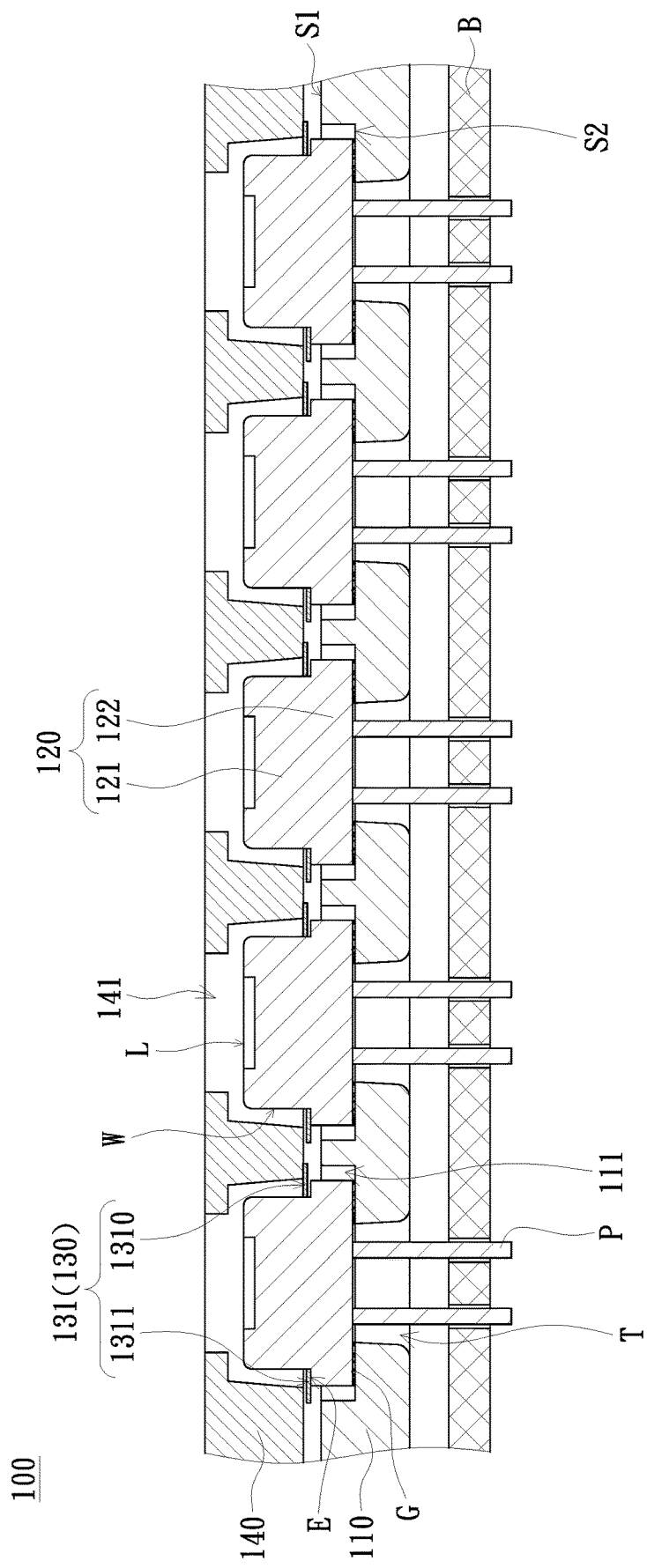
FIG. 1 is a cross-sectional schematic diagram of a light source module in accordance with an embodiment of the invention.
Figure 2:
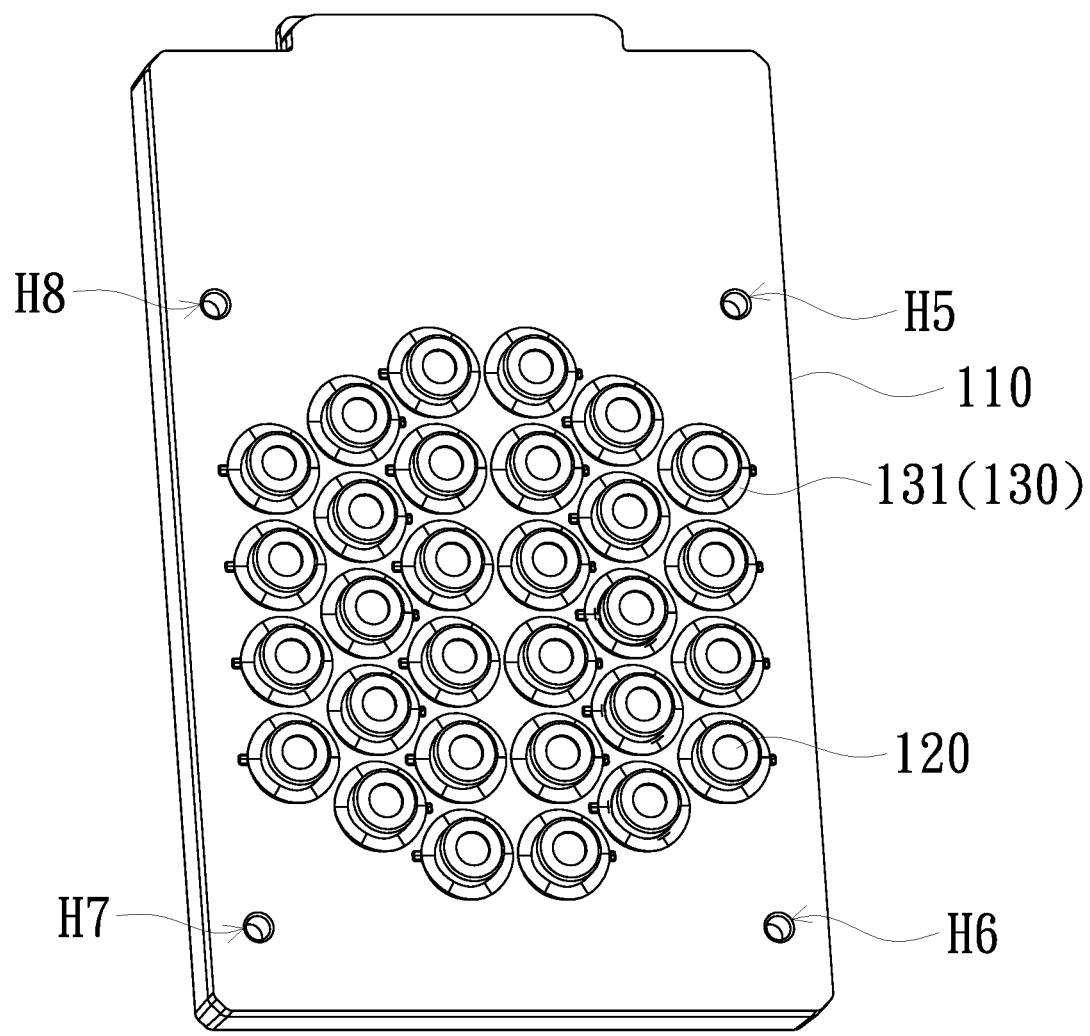
FIG. 2 is a perspective schematic diagram of the light source module of FIG. 1 without showing a cover plate.
Figure 3:
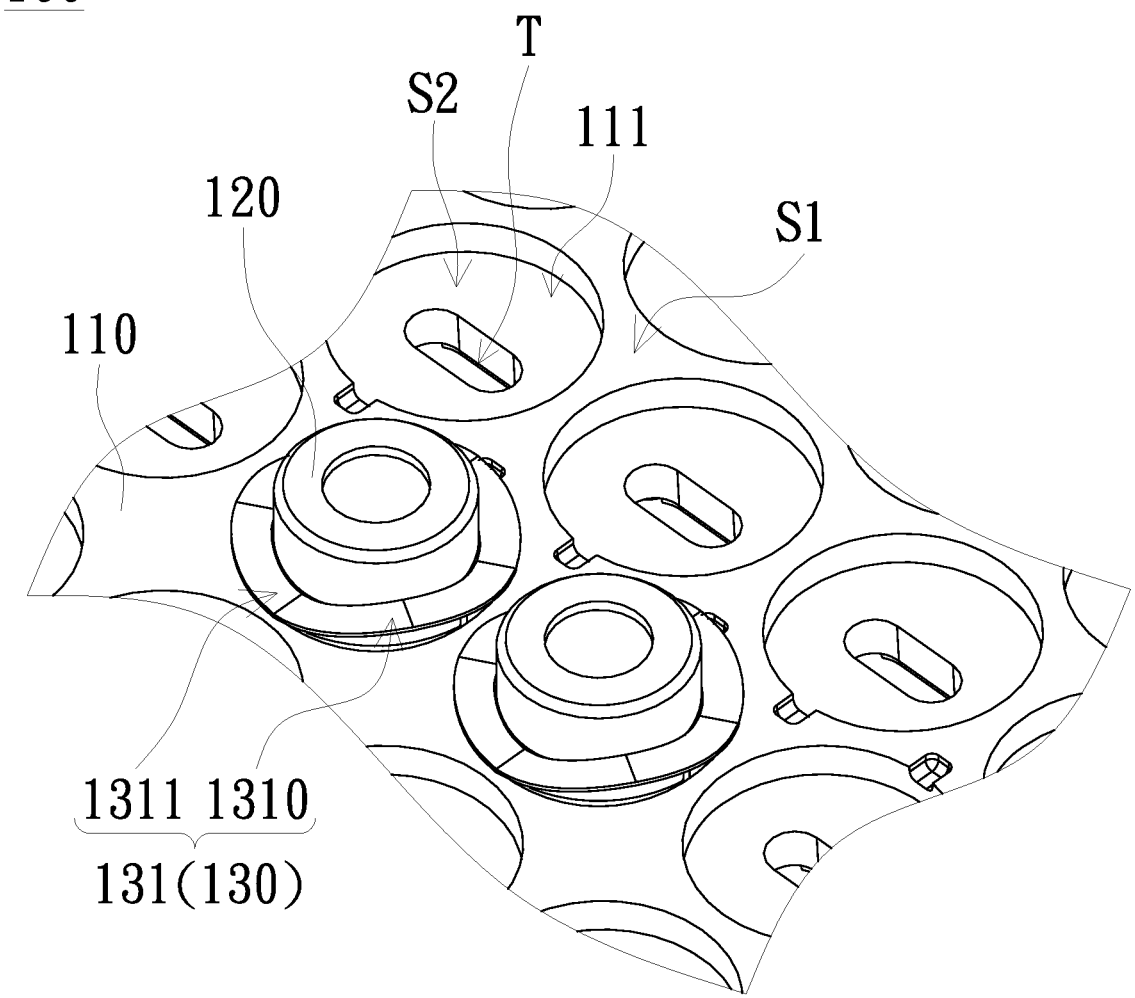
FIG. 3 is a partially assembly schematic diagram of the cover plate, a light emitting element, and a buffer element in FIG. 1.

FIG. 1 is a cross-sectional schematic view of a light source module in accordance with an embodiment of the invention. FIG. 2 is a perspective schematic view of the light source module of FIG. 1 without showing a cover plate. FIG. 3 is a partially assembly schematic view of a substrate, a light emitting element, and a buffer element in FIG. 1. Please refer to FIG. 1, FIG. 2, and FIG. 3. The light source module 100 includes a substrate 110, a plurality of light emitting elements 120, a buffer element 130, and a cover plate 140 (shown in FIG. 1). The substrate 110 has a plurality of accommodation grooves 111. The light emitting elements 120 are respectively disposed in the accommodation grooves 111. Each of the light emitting elements 120 has a light emitting portion 121 and a bottom portion 122 connected with each other. The light emitting portion 121 is located on the bottom portion 122, and the bottom portion 122 has an edge E. The buffer element 130 is pressed against the edges E of the bottom portions 122 of the light emitting elements 120. The cover plate 140 is combined with the substrate 110 and is pressed against the buffer element 130. The cover plate 140 has a plurality of first openings 141. The first openings 141 respectively expose the light emitting elements 120. It means that when viewed from along the direction from the light emission face toward the light emitting element 120, the edges E of the bottom portions 122 can be seen, that is, the diameter of the bottom portions 122 are larger than the diameter of the light emitting portions 121.

The light emitting elements 120 can be fixed in the accommodation grooves 111 by the thermal greases G, but is not limited thereto. The light emitting portion 121 of the light emitting element 120 is configured to generate a light beam. The light emitting portion 121 can have a light emission end L (labeled in FIG. 1) at the side away from the bottom portion 122. The aforementioned beam is emitted from the light emission end L. In this embodiment, the light emitting element 120 can be a laser diode, but is not limited thereto. For example, the light emitting element 120 can also be a light emitting diode or other light sources. In an embodiment, the light emitting element 120 can emit, for example, a blue beam, but the invention does not limit the beam color of the light emitting element 120. In addition, a side of the substrate 110 away from the cover plate 140 is provided with a circuit board B, and the light emitting elements 120 are, for example, electrically connected to the circuit board B. In particular, the bottom portion 122 of the light emitting element 120 has two pins P (shown in FIG. 1), and the pins P are electrically connected with the circuit board B.

Please refer to FIG. 1 and FIG. 3. The accommodation grooves 111 can be formed on a surface S1 of the substrate 110 facing the cover plate 140, and the shapes of the accommodation grooves 111 can correspond to the shapes of the bottom portions 122 of the light emitting elements 120. In addition, the substrate 110 can further have through holes T communicating with the accommodation grooves 111. The pin P of the light emitting element 120 extends into the through hole T and is electrically connected with the circuit board B. In particular, the through hole T, for example, penetrates through the substrate 110 from the bottoms face S2 of the accommodation groove 111, so that the pin P of the light emitting element 120 is electrically connected with the circuit board B through the through hole T.

Figure 4:
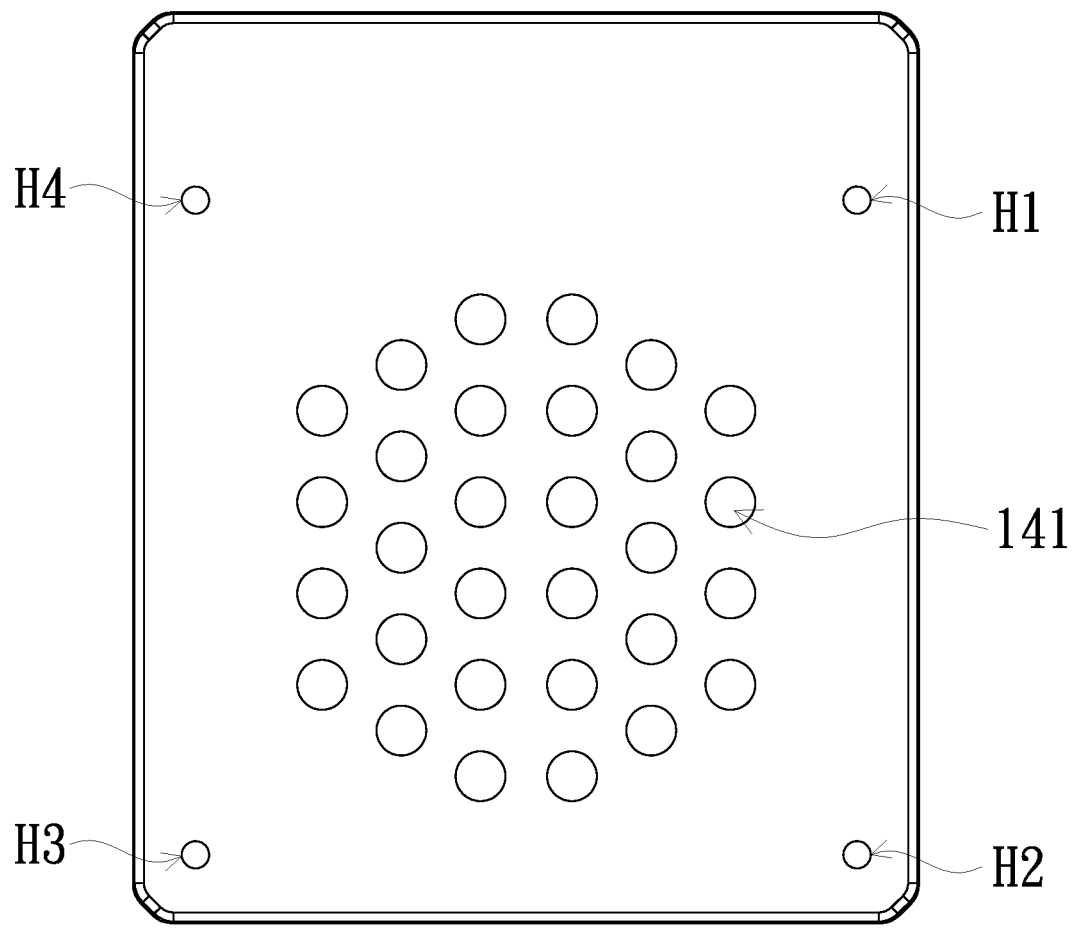
FIG. 4 is a schematic top diagram of the cover plate in FIG. 1.

FIG. 4 is a schematic top view of the cover plate in FIG. 1. Please refer to FIG. 1 and FIG. 4. The first opening 141 of the cover plate 140 exposes the light emission end L of the light emitting portion 121, so that the beam generated by the light emitting portion 121 can exit through the first opening 141. In addition, in another embodiment, the thickness of the cover plate 140 may be less than the height of the light emitting portion 121, and the light emitting portion 121 extends out from the first opening 141 and is exposed. Further, the material of the cover plate 140 of this embodiment includes, for example, metal, but is not limited thereto.

The cover plate 140 can be fastened to the substrate 110 by a plurality of screws (not shown) to be combined to the substrate 110, so that the light emitting elements 120 are fixed in the accommodation grooves 111. In detail, the cover plate 140 has, for example, four screw holes H1, H2, H3, and H4 respectively corresponding to four screw holes H5, H6, H7, and H8 of the substrate 110 (shown in FIG. 2). Because the screw holes H1, H2, H3, and H4 are generally arranged at the edge of the cover plate 140, each of the light emitting elements 120 will be unevenly pressed due to the inconsistent distances from the screw holes H1, H2, H3, and H4 if the buffer element 130 is not mounted around the light emitting elements 120. For example, in the situation that the buffer element 130 is not mounted around the light emitting elements 120, the light emitting elements 120 closer to the screw holes H1, H2, H3, and H4 may receive greater pressure, while the light emitting elements 120 farther away from the screw holes H1, H2, H3, and H4 may receive less pressure. Thus, it is easy to cause the optical axis of some light emitting elements 120 to tilt when the light emitting elements 120 receive an uneven pressure, which in turn makes the light spot generated by the light source module 100 uneven. In addition, the uneven pressure on the light emitting elements 120 may also cause an uneven pressure on the thermal grease G under the light emitting elements 120, resulting in different thicknesses of the thermal greases G from each other, thereby causing the differences in the heat dissipation efficiency of the light emitting elements 120. Because the luminous efficiency of the light emitting element 120 is affected by temperature, the light emitting elements 120 may have inconsistent luminous brightness when having different thermal dissipation efficiencies, and therefore the light spot uniformity of the light source module 100 is also affected under this condition.

However, because the pressure applied by the cover plate 140 to the light emitting elements 120 can be adjusted by the buffer element 130 in this embodiment, the cover plate 140 can still uniformly apply force to each of the light emitting elements 120 even if the screw holes H1, H2, H3, and H4 of the cover plate 140 are still at different distances from the light emitting elements 120. Therefore, the problem of the tilt of the optical axes of the light emitting elements 120 and the problem of the different heat dissipation efficiencies due to the different thicknesses of the thermal greases G under the light emitting elements 120 can be improved. Based on the above, the light spot uniformity of the light source module 100 of this embodiment can be improved.

The material of the buffer element 130 of this embodiment may include metal, such as stainless steel, but is not limited thereto. As shown in FIG. 1, the buffer element 130 can contact the side wall W of the light emitting portion 121 of the light emitting element 120. In other embodiments, the buffer element 130 may also be separated from the side wall W of the light emitting portion 121 of the light emitting element 120 without contacting. In detail, the buffer element 130 may have an opening for being mounted around the light emitting element 120, and the width of the opening may be slightly larger than or equal to the outer diameter of the light emitting portion 121. For example, the buffer element 130 may include a plurality of buffer rings 131, and the inner diameter of the buffer ring 131 may be slightly larger than or equal to the outer diameter of the light emitting portion 121. The buffer element 130 of the invention may have different pressure requirements according to the different contact areas and thermal grease materials with other elements, and the buffer element 130 can change the design of the thickness, material, size or compression height thereof according to the different pressure requirements.

Figure 5A:
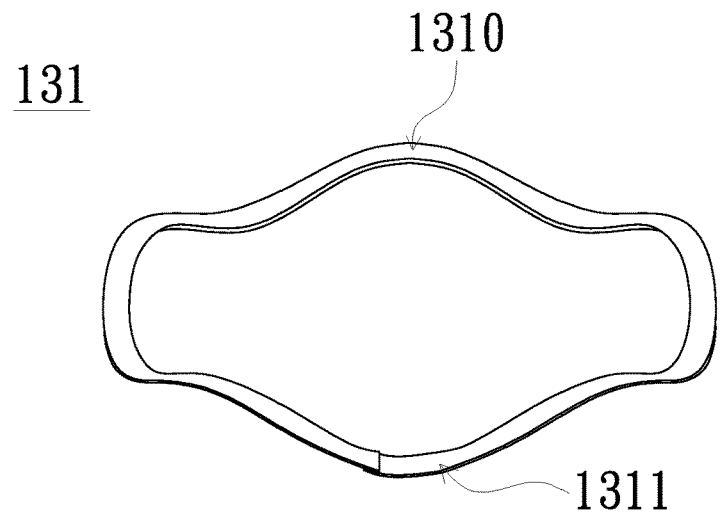
FIG. 5A is a schematic diagram of the buffer element in FIG. 1.

FIG. 5A is a schematic view of the buffer element in FIG. 1. The buffer rings 131 are respectively mounted around the light emitting portions 121 and are pressed against the edges E of the bottom portions 122. The detailed structure of the buffer ring 131 is shown in FIG. 3 and FIG. 5A. As shown, the buffer ring 131 is presented in an undulating appearance and has a plurality of top ends 1310 and a plurality of bottom ends 1311. Please refer to FIG. 1 again. The bottom ends 1311 contact the edges E of the bottom portions 122 and the top ends 1310 contact the cover plate 140 when the cover plate 140 is pressed against the substrate 110. In this way, the cover plate 140 can respectively press the light emitting elements 120 through the buffer rings 131 instead of directly pressing on the light emitting elements 120, so that the light emitting elements 120 can be uniformly pressed. In addition, because the buffer rings 131 are individually mounted around the light emitting elements 120, the buffer rings 131 can be arranged in accordance with the arrangement of the light emitting elements 120, which has the advantage of flexible configuration.

Figure 5B:
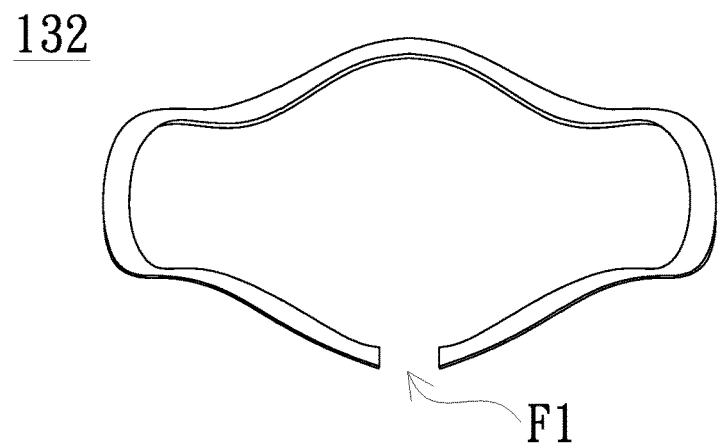
FIG. 5B is a schematic diagram of a buffer element in accordance with another embodiment of the invention.
Figure 5C:
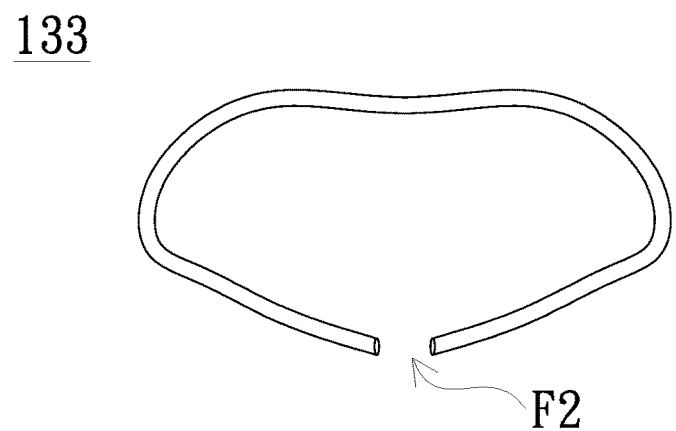
FIG. 5C is a schematic diagram of a buffer element in accordance with another embodiment of the invention.

Please refer to FIG. 5A again. The buffer ring 131 is, for example, a closed ring, but is not limited thereto. FIG. 5B is a schematic view of a buffer element in accordance with another embodiment of the invention. FIG. 5C is a schematic view of a buffer element in accordance with another embodiment of the invention. The buffer ring 132 shown in FIG. 5B may has a fracture opening F1. The buffer rings 131 and 132 are both formed and surrounded by a flat wire. In other embodiments such as the embodiment shown in FIG. 5C, the buffer ring 133 may also be formed and surrounded by a round wire. It should be understood that although the buffer ring 133 of FIG. 5C has the fracture opening F2, the buffer ring 133 may also be designed as a closed ring without the fracture opening F2. The invention does not limit the detailed structures of the buffer rings 131, 132, and 133. In other embodiments, the selection of the buffer ring 131, 132, or 133 may be determined according to actual assembly requirements.

As shown in FIG. 2 and FIG. 3, these rings 131 are separated from each other. In other words, the two adjacent buffer rings 131 are not in contact with each other. In addition, please refer to FIG. 1 again. The buffer element 130 (or the buffer ring 131) illustrated in this embodiment is pressed against the bottom portion 122 of the light emitting element 120. However, in other embodiments, the buffer element 130 may also be pressed against the surface S1 of the substrate 110 and the bottom portion 122 of the light emitting element 122 at the same time. Hence, the invention does not limit whether the buffer element 130 is in contact with the substrate 110 or not.

Figure 6:
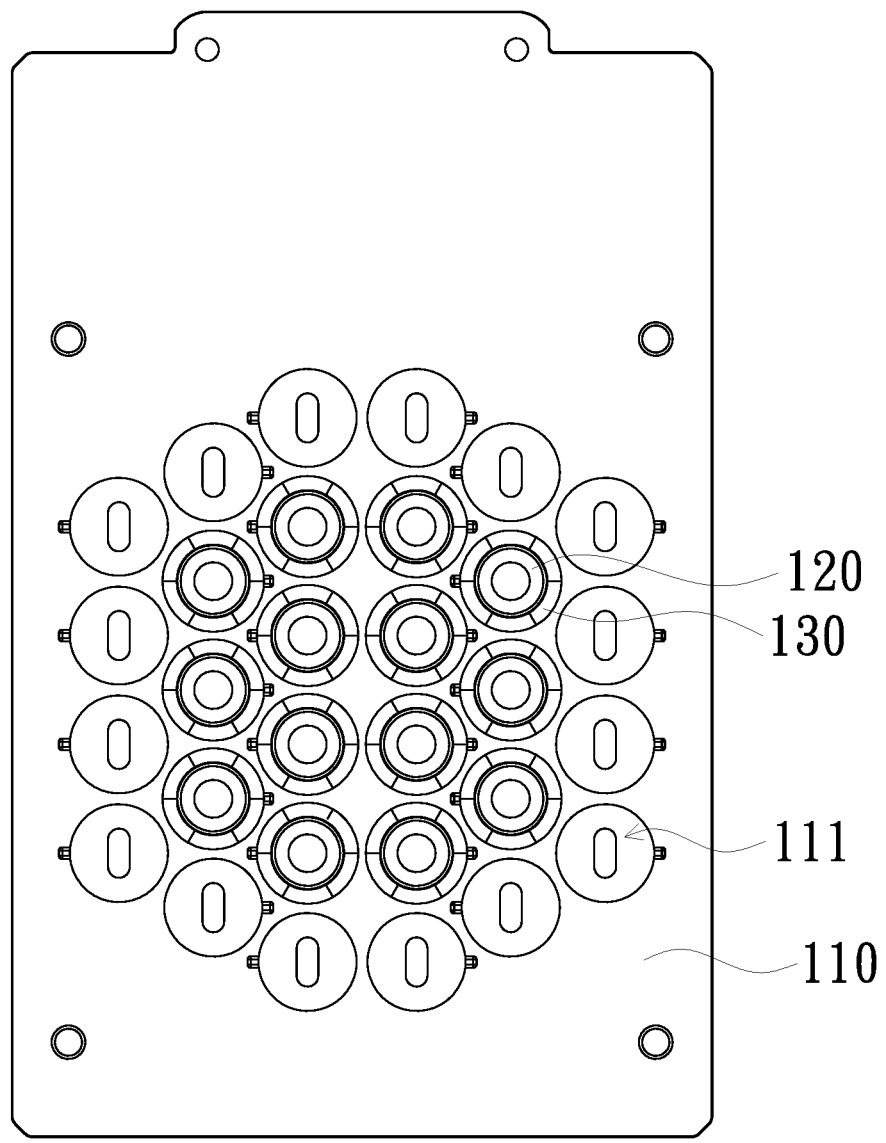
FIG. 6 is a schematic top diagram of a light source module in accordance with another embodiment of the invention without showing a cover plate.

In the embodiment of FIG. 1 and FIG. 2, the number of the accommodation grooves 111 is equal to the number of the light emitting elements 120. In other words, each of the accommodation grooves 111 in FIG. 1 and FIG. 2 is provided with a light emitting element 120. However, the number and the portion of the light emitting elements 120 may vary according to different light spot designs; therefore, the number of the accommodation grooves 111 may be larger than the number of the light emitting elements 120 in other embodiments. FIG. 6 is a schematic top view of a light source module in accordance with another embodiment of the invention without showing a cover plate. In the light source module 100a shown in FIG. 6, part of the accommodation grooves 111 is not provided with the light emitting element 120. It should be understood that the number and the position of the light emitting elements 120 shown in FIG. 6 are only for illustration, and are not used to limit the invention.

Figure 7:
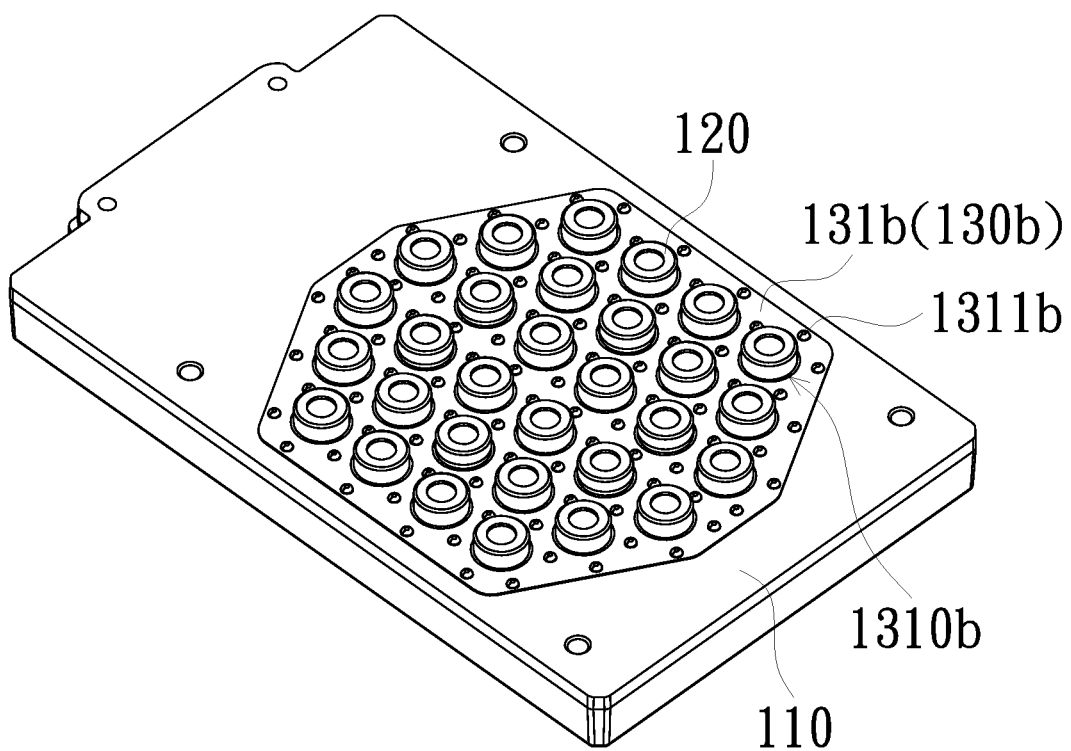
FIG. 7 is a perspective schematic diagram of a light source module in accordance with another embodiment of the invention without showing a cover plate.
Figure 8:
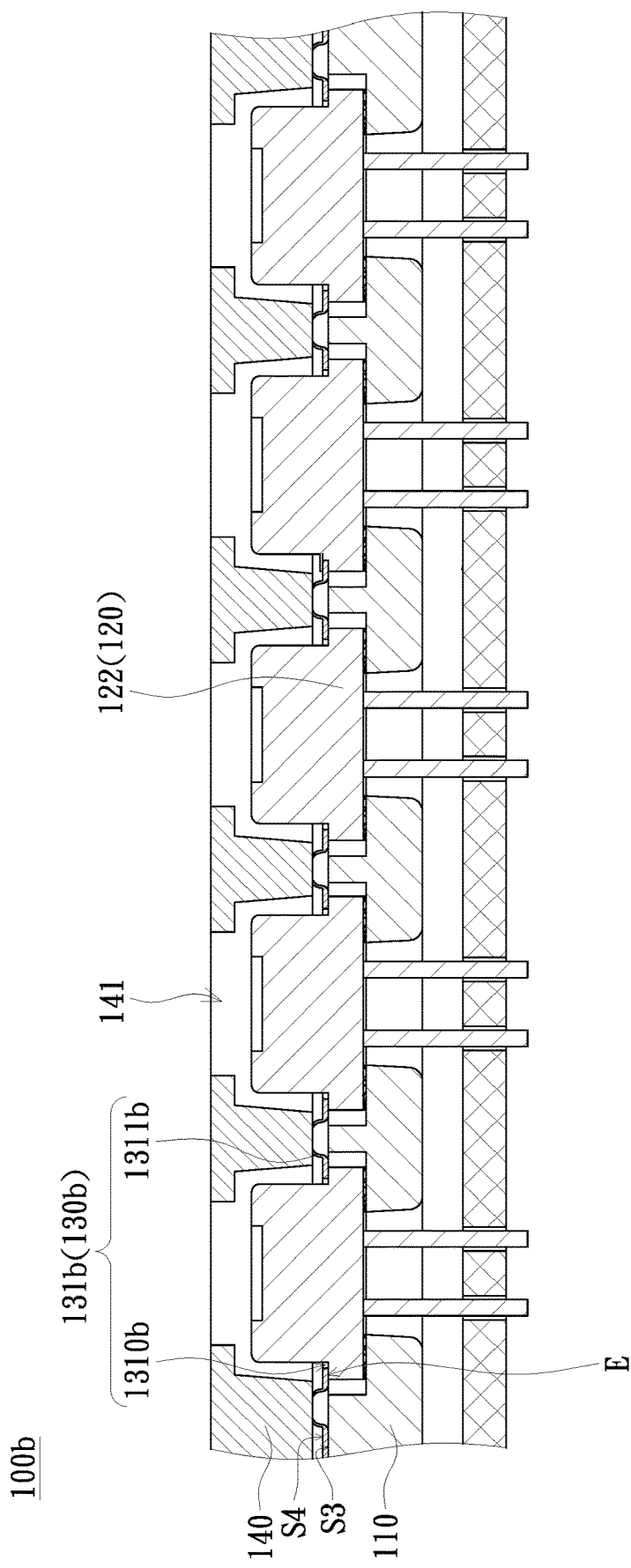
FIG. 8 is a partial cross-sectional schematic diagram of the light source module of FIG. 7 including the cover plate.

FIG. 7 is a perspective schematic view of a light source module in accordance with another embodiment of the invention without showing a cover plate. FIG. 8 is a partial cross-sectional schematic view of the light source module of FIG. 7 including the cover plate. Please refer to FIG. 7 and FIG. 8. The structure and the advantage of the light source module 100b of the embodiment are similar to those of the aforementioned embodiments, and the main difference lies in that the buffer element 130b of this embodiment includes a buffer plate 131b. The buffer plate 131b has a plurality of second openings 1310b (also shown in FIG. 9), respectively corresponding to the first openings 141 of the cover plate 140. The buffer plate 131b has a plurality of protrusion structures 1311b protruding toward the cover plate 140. The protrusion structures 1311b are arranged around the second openings 1310b. The cover plate 140 is pressed against the protrusion structures 1311b. Specifically, please continue to refer to FIG. 8. The buffer plate 131b may have a first surface S3 facing the substrate 110 and a second surface S4 facing the cover plate 140. The first surface S3 is pressed against the substrate 110 and the edges E of the bottom portions 122 of the light emitting elements 120, and the protrusion structures 1311b are located on the second surface S4 and are pressed by the cover plate 140. As such, the cover plate 140 can indirectly press each of the light emitting elements 120 through the buffer plates 131b, so that each of the light emitting elements 120 can be uniformly pressed. In addition, the buffer plates 131b also have the advantage of quick installation.

Figure 9:
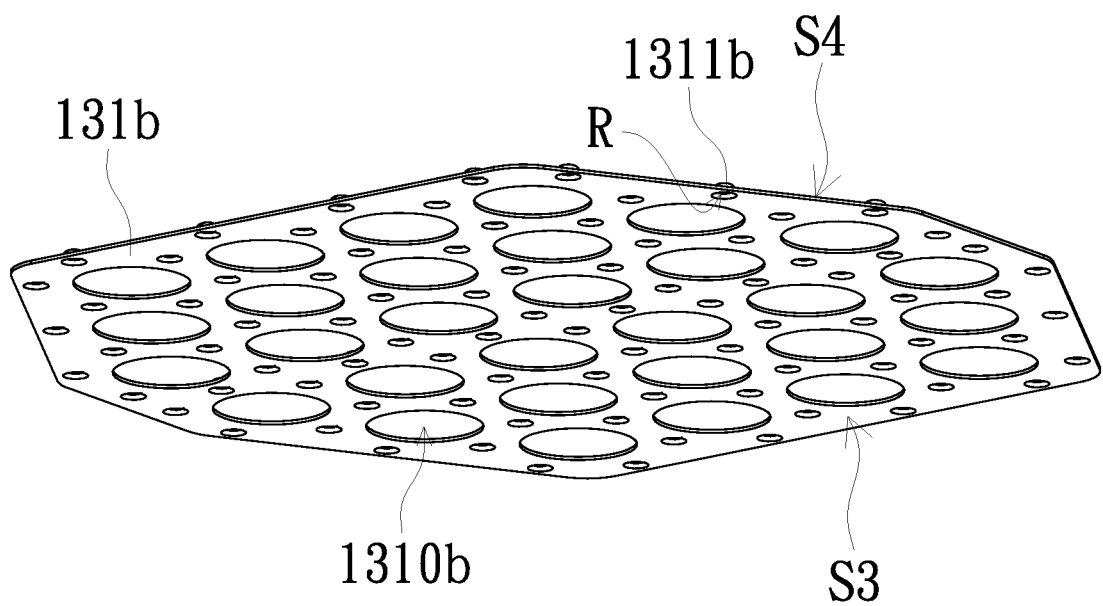
FIG. 9 is a perspective schematic diagram of a buffer plate in FIG. 7.

Please refer to FIG. 9 for the detailed structure of the buffer plate 131b. FIG. 9 is a perspective schematic view of the buffer plate in FIG. 7. The protrusion structures 1311b of the buffer plate 131b can be formed by metal stamping, and the metal stamping also makes the buffer plate 131b form depression structures R corresponding to the protrusion structures 1311b. In detail, by stamping the first surface S3 of the buffer plate 131b, the protrusion structures 1311b are formed on the second surface S4 of the buffer plate 131b, and meanwhile the depression structures R are formed on the first surface S3 of the buffer plate 131b. In should be noted that this embodiment does not limit the forming method of the protrusion structures 1131b, and the buffer plate 131b of other embodiments may not have the depression structures R according to different forming methods.

Figure 10:
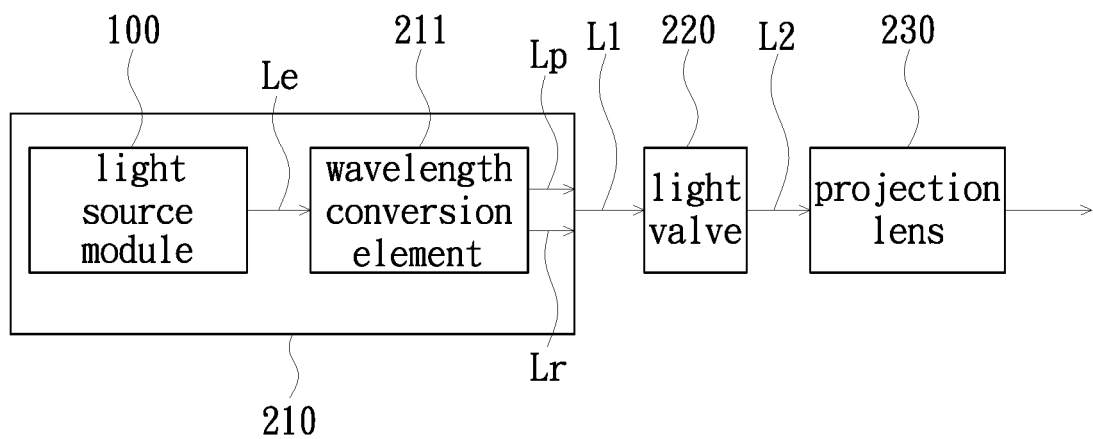
FIG. 10 is a block diagram of a projection apparatus in accordance with an embodiment of the invention.

FIG. 10 is a block diagram of a projection apparatus in accordance with an embodiment of the invention. Please refer to FIG. 10. The projection apparatus 200 includes an illumination system 210, a light valve 220, and a projection lens 230. The illumination system 210 is configured to provide an illumination beam L1. The light valve 220 is disposed on a transmission path of the illumination beam L1 to covert the illumination beam L1 into an image beam L2. The projection lens 230 is disposed on a transmission path of the image beam L2. The illumination system 210 includes the above-mentioned light source module 100.

The illumination system 210 of this embodiment further includes, for example, a wavelength conversion element 211. The light emitting element 120 of the light source module 100 can generate an excitation beam Le, and the wavelength conversion element 211 can be disposed on a transmission path of the excitation beam Le to convert the excitation beam Le into a conversion beam Lp. The wavelength conversion element 211 rotates in time sequences to convert the excitation beam Le into the conversion beam Lp. The part of the excitation beam Le not being converted into the conversion beam Lp is denoted as the beam Lr in FIG. 10. In other embodiments, the illumination system 210 may has a configuration not including a wavelength conversion element. Since such configuration is a common configuration in the technical field of the invention, no redundant detail is to be given herein.

The wavelength conversion element 211 may include a wavelength conversion portion. The wavelength conversion portion generates the conversion beam Lp after being irradiated by the excitation beam Le. In this embodiment, the wavelength conversion portion includes, for example, a wavelength conversion material, such as fluorescent material, phosphorescent material (e.g., phosphor), or quantum dot (e.g., nanomaterial). Furthermore, after being irradiated by the excitation beam Le, the wavelength conversion portion can emit a conversion beam Lp having at least one wavelength. For example, the wavelength conversion portion may include a yellow wavelength conversion material to emit the conversion beam Lp (e.g., yellow beam) after being irradiated by the excitation beam Le. Similarly, in one embodiment, the wavelength conversion portion may include a yellow wavelength conversion material and a green wavelength conversion material to emit the conversion beams Lp (e.g., yellow beam and green beam) after being irradiated by the excitation beam Le. In addition, in another embodiment, the wavelength conversion portion may include a yellow wavelength conversion material, a green wavelength conversion material and a red wavelength conversion material to emit the conversion beam Lp (e.g., yellow beam, green beam and red beam) after being irradiated by the excitation beam Le.

In addition to the above-mentioned wavelength conversion portion, the wavelength conversion element 211 may further include a wavelength maintaining portion. The wavelength maintaining portion does not change the wavelength of the excitation beam Le, and can reflect the excitation beam Le or allow the excitation beam Le to pass therethrough to form the beam Lr in FIG. 10. Specifically, the wavelength maintaining portion may include a reflective portion or a light-transmitting portion, but is not limited thereto. In addition, the openings on the plate can also be used as the wavelength maintaining portion. The illumination beam L1 of this embodiment may include the beam Lr and the conversion beam Lp. Since the features of the light source module 100 have been described in detail in the foregoing, no redundant detail is to be given herein.

The light valve 220 is, for example, a digital micro-mirror device (DMD), a liquid crystal on silicon panel (LCoS panel) or a liquid crystal display (LCD), but is not limited thereto. In addition, this embodiment does not limit the number of the light valves 220. For example, the projection apparatus 200 of this embodiment may adopt a configuration with single-chip liquid crystal display panel or a three-chip liquid crystal display panel, but is not limited thereto.

The projection lens 230 includes, for example, one or more optical lenses, and the diopters of the optical lenses can be the same or different to each other. For example, the optical lenses may include various non-planar lenses, such as a biconcave lens, a biconvex lens, a concavo-convex lens, a convexo-concave lens, a plano-convex lens, and a plano-concave lens, or any combination of the non-planar lens mentioned above. On the other hand, the projection lens 230 may also include a planer optical lens. The invention does not limit the specific structure of the projection lens 230.

Compared with the prior art, the projection apparatus 200 of this embodiment adopts the above-mentioned light source module 100, and the above-mentioned light source module 100 has the advantage of uniform light spot. Therefore, the projection apparatus 200 of this embodiment can provide good image quality. In addition, the light source module 100 in the projection apparatus 200 can also be replaced with the aforementioned light source module 100a or 100b.

Based on the above, in the light source module of the invention, the plurality of light emitting elements are respectively arranged in the plurality of accommodation grooves of the substrate, and the buffer element is pressed between the bottom portions of the light emitting elements and the cover plate. Thus, the cover plate can indirectly apply force to each of the light emitting elements through the buffer element to evenly distribute the pressure on the light emitting elements. In this way, the optical axis of each of the light emitting elements can be prevented from tilting, and the light spot uniformity of the light source module can be improved. On the other hand, since the projection apparatus of the invention has the above-mentioned light source module, the projection apparatus can provide good image quality.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first surface, and the second surface are only used for distinguishing various elements and do not limit the number of the elements.

What is claimed is:

1. A light source module, comprising a substrate, a plurality of light emitting elements, a buffer element, and a cover plate, wherein:
   the substrate has a plurality of accommodation grooves;
   the plurality of light emitting elements are respectively and partially disposed in the plurality of accommodation grooves, each of the plurality of light emitting elements has a light emitting portion and a bottom portion connected with each other, the light emitting portion is located on the bottom portion, and the bottom portion has an edge;
   the buffer element is mounted around the light emitting portion of each of the plurality of light emitting elements; and
   the cover plate is combined with the substrate, wherein the cover plate has a plurality of first openings respectively exposing the plurality of light emitting elements,
   wherein the plurality of light emitting elements are respectively and partially disposed inside the plurality of first openings, the buffer element is disposed outside the plurality of first openings, and the buffer element is pressed against between the edge of the bottom portion of each of the plurality of light emitting elements and the cover plate.

2. The light source module according to claim 1, wherein the buffer element comprises a plurality of buffer rings, the plurality of buffer rings are respectively mounted around the plurality of light emitting portions and are respectively pressed against the edges of the plurality of bottom portions.

3. The light source module according to claim 2, wherein each of the plurality of buffer rings is presented in an undulating appearance and has a plurality of top ends and a plurality of bottom ends, the plurality of bottom ends contact the edges of the plurality of bottom portions, and the plurality of top ends contact the cover plate.

4. The light source module according to claim 2, wherein a shape of each of the plurality of buffer rings is a closed ring or a fracture opening.

5. The light source module according to claim 2, wherein the plurality of buffer rings are separated from each other.

6. The light source module according to claim 1, wherein the buffer element comprises a buffer plate, the buffer plate has a plurality of second openings respectively corresponding to the plurality of first openings, the buffer plate has a plurality of protrusion structures protruding toward the cover plate, the plurality of protrusion structures are arranged around the plurality of second openings, and the cover plate is pressed against the plurality of protrusion structures.

7. The light source module according to claim 1, wherein the buffer element contacts side walls of the plurality of light emitting portions of the plurality of light emitting elements or is spaced apart from the plurality of side walls.

8. The light source module according to claim 1, wherein a number of the plurality of accommodation grooves is large than or equal to a number of the plurality of light emitting elements.

9. The light source module according to claim 1, wherein the plurality of light emitting elements comprise a plurality of light emitting diodes.

10. The light source module according to claim 1, further comprising a circuit board disposed on a side of the substrate away from the cover plate, wherein the plurality of light emitting elements are electrically connected with the circuit board.

11. A projection apparatus, comprising an illumination system, a light valve, and a projection lens, the illumination system being configured to provide an illumination beam, the light valve being disposed on a transmission path of the illumination beam to covert the illumination beam into an image beam, and the projection lens being disposed on a transmission path of the image beam, wherein the illumination system comprises a light source module, the light source module comprises a substrate, a plurality of light emitting elements, a buffer element, and a cover plate, and wherein:

the substrate has a plurality of accommodation grooves;

the plurality of light emitting elements are respectively and partially disposed in the plurality of accommodation grooves, each of the plurality of light emitting elements has a light emitting portion and a bottom portion connected with each other, the light emitting portion is located on the bottom portion, and the bottom portion has an edge;

the buffer element is mounted around the light emitting portion of each of the plurality of light emitting elements; and the cover plate is combined with the substrate, wherein the cover plate has a plurality of first openings respectively exposing the plurality of light emitting elements, wherein the plurality of light emitting elements are respectively and partially disposed inside the plurality of first openings, the buffer element is disposed outside the plurality of first openings, and the buffer element is pressed against between the edge of the bottom portion of each of the plurality of light emitting elements and the cover plate.

12. The projection apparatus according to claim 11, wherein the buffer element comprises a plurality of buffer rings, the plurality of buffer rings are respectively mounted around the plurality of light emitting portions and are respectively pressed against the edges of the plurality of bottom portions.

13. The projection apparatus according to claim 12, wherein each of the plurality of buffer rings is presented in an undulating appearance and has a plurality of top ends and a plurality of bottom ends, the plurality of bottom ends contact the edges of the plurality of bottom portions, and the plurality of top ends contact the cover plate.

14. The projection apparatus according to claim 12, wherein a shape of each of the plurality of buffer rings is a closed ring or a fracture opening.

15. The projection apparatus according to claim 12, wherein the plurality of buffer rings are separated from each other.

16. The projection apparatus according to claim 11, wherein the buffer element comprises a buffer plate, the buffer plate has a plurality of second openings respectively corresponding to the plurality of first openings, the buffer plate has a plurality of protrusion structures protruding toward the cover plate, the plurality of protrusion structures are arranged around the plurality of second openings, and the cover plate is pressed against the plurality of protrusion structures.

17. The projection apparatus according to claim 11, wherein the buffer element contacts side walls of the plurality of light emitting portions of the plurality of light emitting elements or is spaced apart from the plurality of side walls.

18. The projection apparatus according to claim 11, wherein a number of the plurality of accommodation grooves is large than or equal to a number of the plurality of light emitting elements.

19. The projection apparatus according to claim 11, wherein the plurality of light emitting elements comprises a plurality of light emitting diodes.

20. The projection apparatus according to claim 11, further comprising a circuit board disposed on a side of the substrate away from the cover plate, wherein the plurality of light emitting elements are electrically connected with the circuit board.

\* \* \* \* \*